United States Patent
Yang et al.

(10) Patent No.: US 7,184,283 B2
(45) Date of Patent: *Feb. 27, 2007

(54) SWITCHING FREQUENCY JITTER HAVING OUTPUT RIPPLE CANCEL FOR POWER SUPPLIES

(75) Inventors: Ta-yung Yang, Milpitas, CA (US); Guo-Kiang Hung, Sindian (TW); Song-Yi Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 241 days.

This patent is subject to a terminal disclaimer.

(21) Appl. No.: 10/914,820

(22) Filed: Aug. 9, 2004

(65) Prior Publication Data

US 2006/0031689 A1     Feb. 9, 2006

(51) Int. Cl.
*H02M 1/12*      (2006.01)
(52) U.S. Cl. ......................... 363/41; 323/283
(58) Field of Classification Search ............ 363/16–17, 363/21.01, 21.11, 21.18, 26, 41; 323/231, 323/283, 284, 285; 455/255, 258, 264
See application file for complete search history.

(56) References Cited

U.S. PATENT DOCUMENTS

| | | | | |
|---|---|---|---|---|
| 4,654,770 A | * | 3/1987 | Santurtun et al. | ............ 363/17 |
| 5,590,033 A | * | 12/1996 | Kawano | ...................... 363/41 |
| 2004/0092242 A1 | * | 5/2004 | Endo | .......................... 455/264 |

* cited by examiner

*Primary Examiner*—Jessica Han
(74) *Attorney, Agent, or Firm*—J.C. Patents

(57) ABSTRACT

A switching frequency jitter having output ripple cancel includes a pattern generator generating a pattern code in response to a clock signal. An oscillator generates an oscillation signal for determining a switching frequency of a switching signal in response to the variation of the pattern code. An attenuator is connected to a voltage feedback loop for attenuating a feedback signal. The feedback signal is utilized to control the pulse width of the switching signal. A programmable resistor is connected to the attenuator for programming an attenuation rate of the attenuator in response to the pattern code. The attenuation rate is increased whenever the switching frequency increases. The pulse width of the switching signal is thus reduced, which compensates the decrease of the switching period and keeps the output power and the output voltage of the power supply constant.

4 Claims, 5 Drawing Sheets

SWITCHING FREQUENCY JITTER HAVING OUTPUT RIPPLE CANCEL FOR POWER SUPPLIES

BACKGROUND OF THE INVENTION

1. Field of the Invention

The present invention relates to a power supply, and more specifically relates to a control method of a switching mode power supply.

2. Description of Related Art

Power supplies have been used to convert an unregulated power source to a regulated voltage or current. FIG. 1 shows a traditional power supply. The power supply comprises a PWM controller 10 for generating a switching signal $V_{PWM}$. The switching signal $V_{PWM}$ is used for switching a transformer 11 via a transistor 20. The duty cycle of the switching signal $V_{PWM}$ determines the power delivered from an input of a power source to an output of the power supply. Although the switching technology can reduce the size of the power supply, switching devices generate electric and magnetic interference (EMI) that interferes the power source. An EMI filter 15 equipped at an input of the power supply is utilized to reduce the EMI. However, the EMI filter 15 causes power consumption and increases the cost and the size of the power supply. In recent development, many prior arts have been proposed to reduce the EMI using frequency jitter. For example, "Effects of Switching Frequency Modulation on EMI Performance of a Converter Using Spread Spectrum Approach" by M. Rahkala, T. Suntio, K. Kalliomaki, APEC 2002 (Applied Power Electronics Conference and Exposition, 2002), 17-Annual, IEEE, Volume 1, 10–14, Mar., 2002, Pages: 93–99; "Offline Converter with Integrated Softstart and Frequency Jitter" by Balu Balakirshnan, Alex Djenguerian, U.S. Pat. No. 6,229,366, May 8, 2001; and "Frequency Jittering Control for Varying the Switching Frequency of a Power Supply" by Balu Balakirshnan, Alex Djenguerian, U.S. Pat. No. 6,249,876, Jun. 19, 2001. However, the disadvantage of these prior arts is that the frequency jitter generates an undesirable ripple signal at the output of the power supply. The undesirable ripple signal generated by the frequency jitter could be realized as following description. An output power $P_O$ of the power supply is the product of an output voltage $V_O$ and an output current $I_O$, which is given by, $$P_O = V_O \times I_O = \eta \times P_{IN} \ldots \quad (1)$$

An input power $P_{IN}$ of the transformer 11 and a switching current $I_P$ can be respectively expressed by, $$P_{IN} = \frac{1}{2 \times T} \times L_P \times I_P^2$$

$$I_P = \frac{V_{IN}}{L_P} \times T_{ON}$$

Where $\eta$ is the efficiency of the transformer 11; $V_{IN}$ is an input voltage of the transformer 11; $L_P$ is the primary inductance of the transformer 11; T is a switching period of the switching signal $V_{PWM}$; $T_{ON}$ is an on-time of the switching signal $V_{PWM}$.

The equation (1) can be rewritten as, $$P_O = \eta \times \frac{V_{IN}^2 \times T_{ON}^2}{2 \times L_P \times T} \quad (2)$$

The switching period T varies in response to the frequency jitter. As shown in equation (2), the output power $P_O$ varies whenever the switching period T varies. And therefore the undesirable ripple signal will be generated as the output power $P_O$ varies.

An object of the present invention is to provide a frequency jitter to reduce the EMI for a power supply, in which the frequency jitter of the present invention will not generate the undesirable ripple signal at the output of the power supply.

SUMMARY OF THE INVENTION

A switching frequency jitter having output ripple cancel for power supplies according to the present invention includes a clock generator for generating a clock signal. A pattern generator generates a pattern code in response to the clock signal. An oscillator produces an oscillation signal to determine a switching frequency of a switching signal in response to the pattern code. An attenuator is connected to a voltage feedback loop for attenuating a feedback signal, in which the feedback signal is utilized to control the pulse width of the switching signal and to control the output power of the power supply. A programmable resistor is connected to the attenuator for programming an attenuation rate of the attenuator in response to the pattern code. The attenuation rate is increased whenever the switching frequency increases. The pulse width of the switching signal is thus reduced, which compensates the decrease of the switching period and keeps the output power and output voltage constant.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
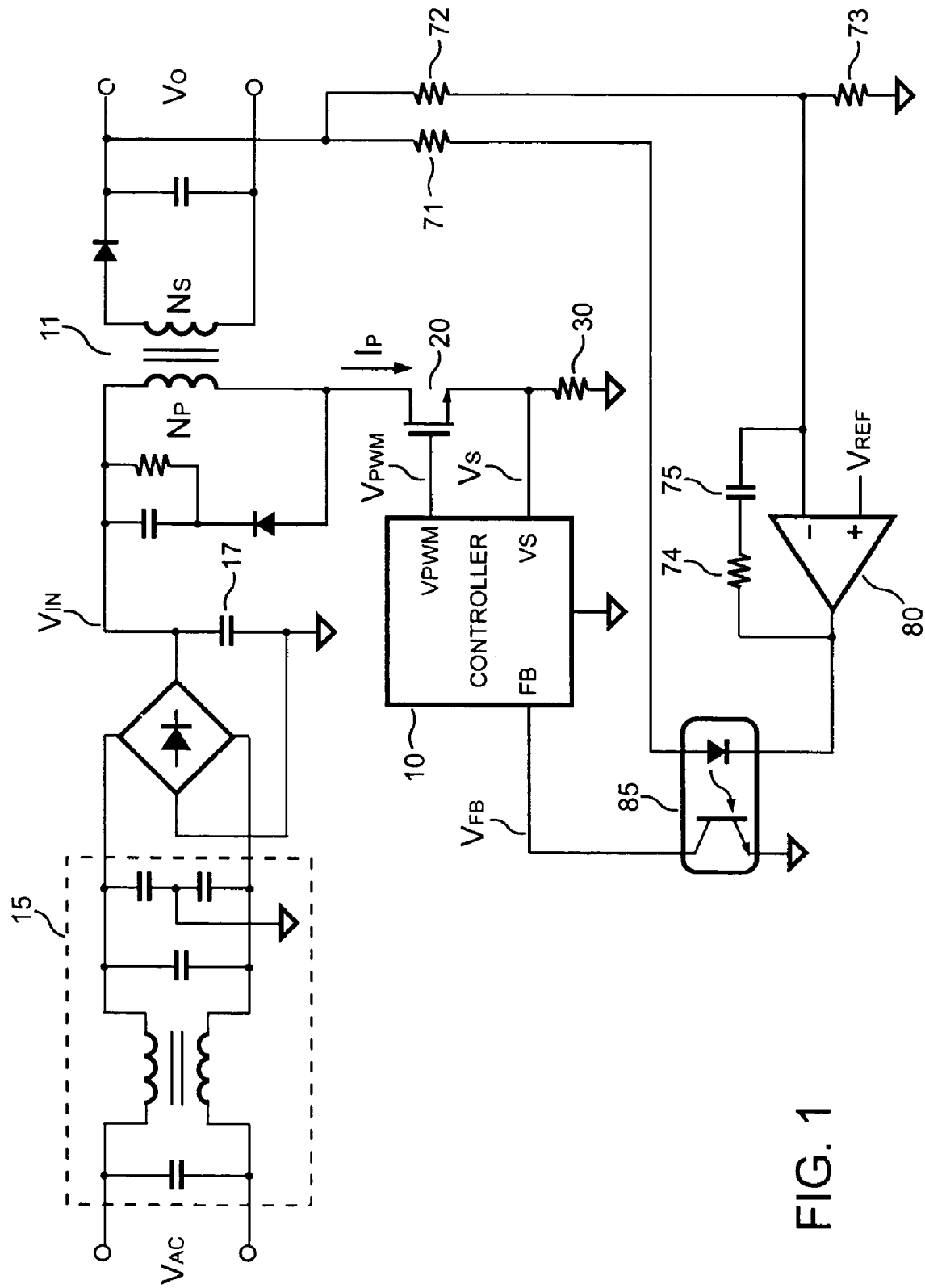
FIG. 1 shows a traditional power supply having an EMI filter.

FIG. 1 shows a traditional power supply having an EMI filter. A PWM controller 10 modulates the pulse width of a switching signal $V_{PWM}$ in response to a feedback signal $V_{FB}$.

The feedback signal $V_{FB}$ is obtained from an opto-coupler 85. An operational amplifier 80 and a reference voltage $V_{REF}$ form an error amplifier to drive the opto-coupler 85. Resistors 72, 73 and the error amplifier form a voltage feedback loop to regulate an output voltage $V_O$ of the power supply. A switching current $I_P$ of a transformer 11 is converted into a switching-current signal $V_S$ through a sense resistor 30. The switching-current signal $V_S$ is provided to the PWM controller 10 for the pulse width modulation of the switching signal $V_{PWM}$.

Figure 2:
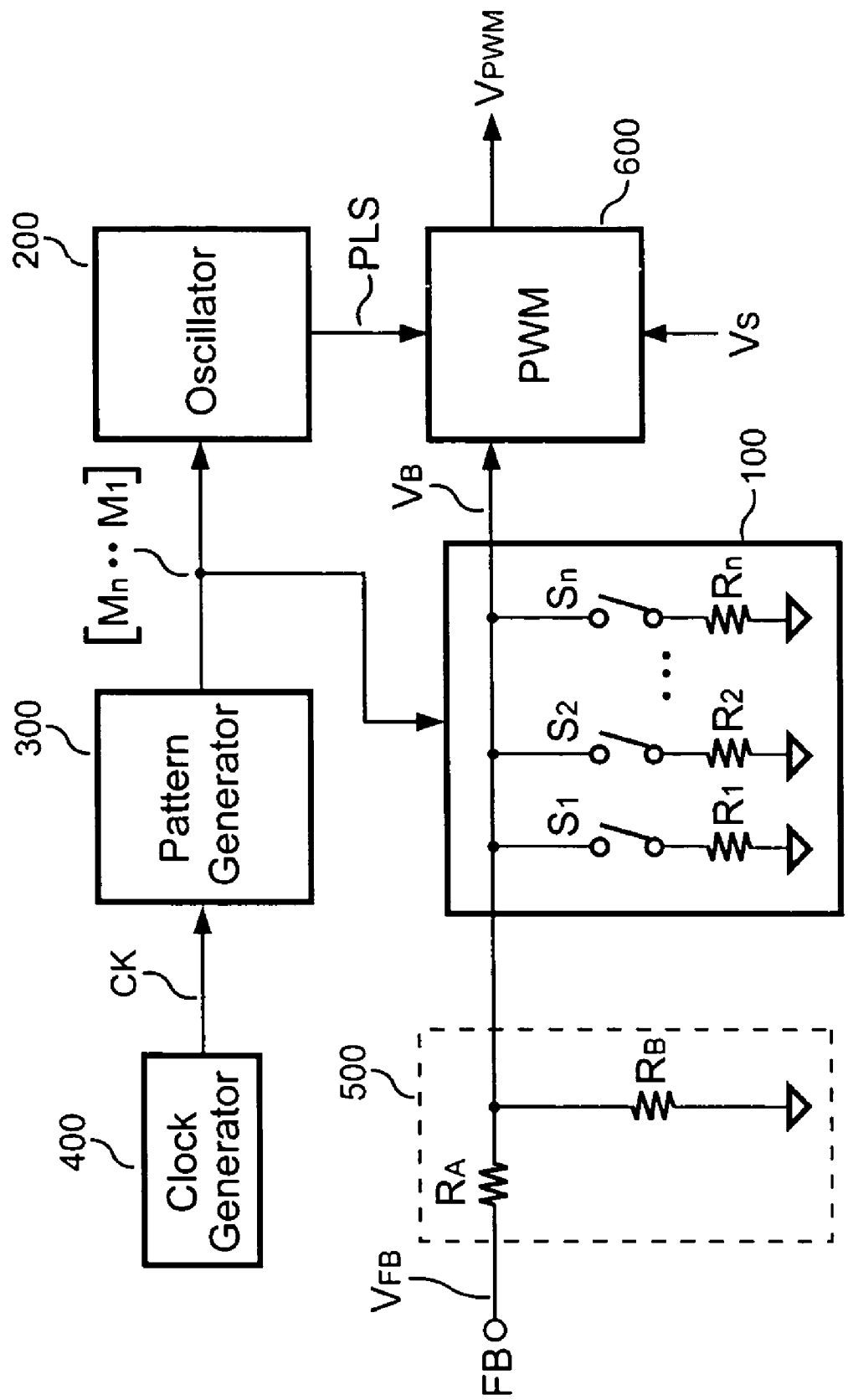
FIG. 2 shows an embodiment of a frequency jitter having output ripple cancel according to the present invention.

FIG. 2 is a preferred embodiment of a switching frequency jitter having output ripple cancel according to the present invention. A clock generator 400 generates a clock signal CK for determining a jitter frequency. A pattern generator 300 is utilized to generate a pattern code [$M_n \ldots M_1$] in response to the clock signal CK. An oscillator 200 is used for determining the switching frequency of the switching signal $V_{PWM}$ in response to the pattern code [$M_n \ldots M_1$]. A resistor $R_A$ and a resistor $R_B$ develop an attenuator 500. The resistor $R_A$ is coupled to the voltage feedback loop for attenuating the feedback signal $V_{FB}$. A first terminal of the resistor $R_A$ is supplied with the feedback signal $V_{FB}$. The feedback signal $V_{FB}$ is utilized to control the pulse width of the switching signal $V_{PWM}$ via a PWM control circuit 600. Therefore the output power of the power supply can be controlled. A second terminal of the resistor $R_A$ is connected to a first terminal of the resistor $R_B$. A second terminal of the resistor $R_B$ is connected to a ground reference level. A voltage $V_B$ outputted from an output of the attenuator 500 is obtained across the resistor $R_B$. A programmable resistor 100 is connected to the output of the attenuator 500 for programming an attenuation rate of the attenuator 500 in response to the pattern code [$M_n \ldots M_1$]. The attenuation rate is increased whenever the switching frequency increases. The pulse width of the switching signal $V_{PWM}$ is therefore reduced, which compensates the decrease of the switching period and keeps the output power and the output voltage of the power supply constant.

The programmable resistor 100 comprises switching-resistor sets connected in parallel, in which the switching-resistor sets are formed by resistors $R_1, R_2, \ldots, R_n$ and switches $S_1, S_2, \ldots S_n$. The switch $S_1$ and the resistor $R_1$ are connected in series. The switch $S_2$ and the resistor $R_2$ are connected in series. The switch $S_n$ and the resistor $R_n$ are connected in series. The pattern code [$M_n \ldots M_1$] controls switches $S_1, S_2, \ldots S_n$.

Figure 3:
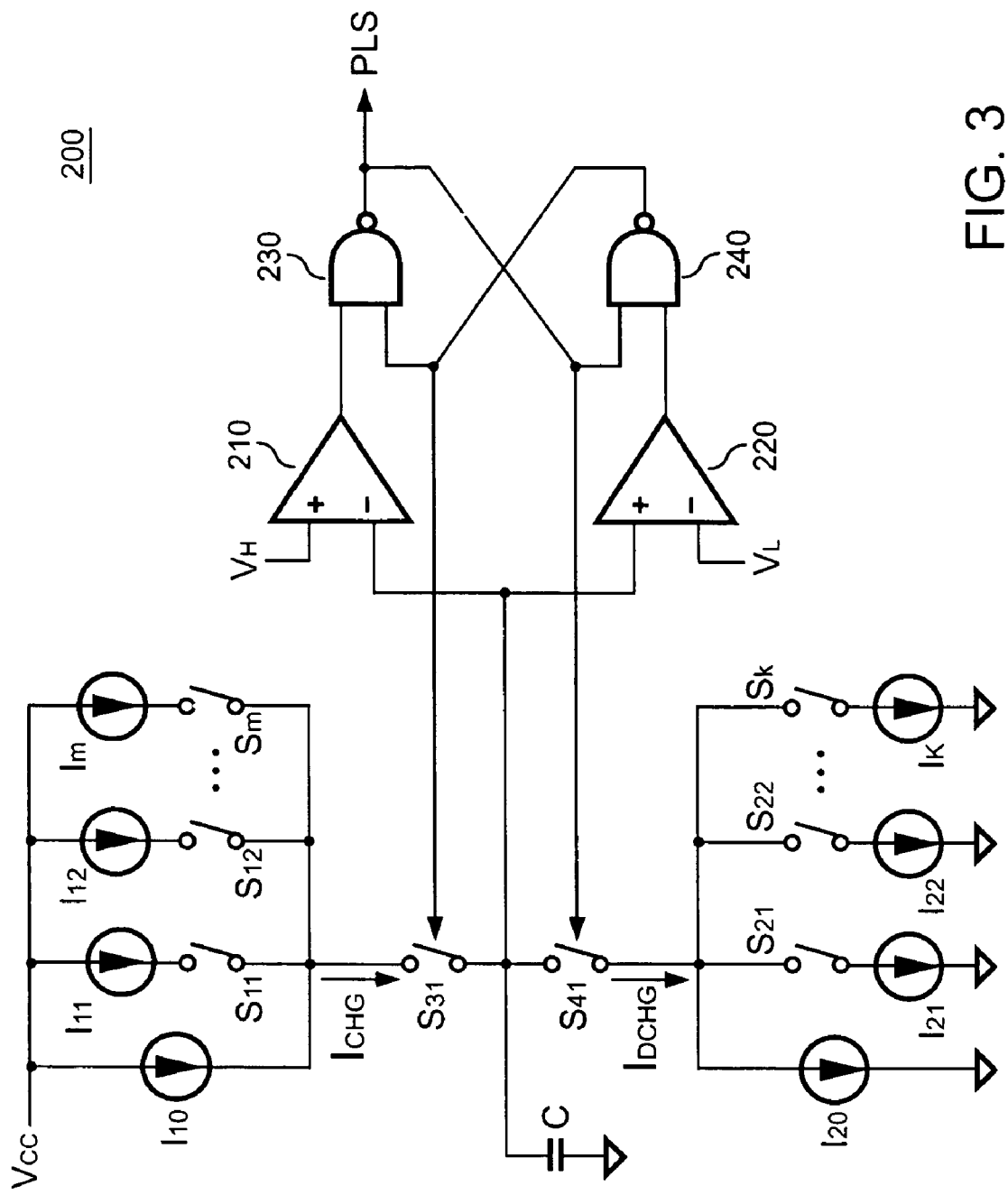
FIG. 3 shows an embodiment of an oscillator according to the present invention.

FIG. 3 shows an embodiment of the oscillator 200 according to the present invention. Programmable charge-current sources comprise current sources $I_{11}, I_{12} \ldots I_m$ and switches $S_{11}, S_{12} \ldots S_m$, in which the current source $I_{11}$ and the switch $S_{11}$ connected in series form a first programmable charge-current source. The current source $I_{12}$ and the switch $S_{12}$ connected in series form a second programmable charge-current source. The current source $I_m$ and the switch $S_m$ connected in series form a number-m programmable charge-current source. Programmable charge-current sources are connected to each other in parallel. The pattern code [$M_n \ldots M_1$] controls switches $S_{11}, S_{12}, \ldots S_m$. A current source $I_{10}$ is connected in parallel with programmable charge-current sources, in which a first terminal of the current source $I_{10}$ is supplied with a supply voltage $V_{CC}$. The current source $I_{10}$ and programmable charge-current sources produce a charge current $I_{CHG}$.

Programmable discharge-current sources comprise current sources $I_{21}, I_{22} \ldots, I_k$ and switches $S_{21}, S_{22} \ldots S_k$, in which the current source $I_{21}$ and the switch $S_{21}$ connected in series form a first programmable discharge-current source. The current source $I_{22}$ and the switch $S_{22}$ connected in series form a second programmable discharge-current source. The current source $I_k$ and the switch $S_k$ connected in series form a number-k programmable discharge-current source. The programmable discharge-current sources are connected to each other in parallel. The pattern code [$M_n \ldots M_1$] controls the switches $S_{21}, S_{22}, \ldots S_k$. A current source $I_{20}$ is connected in parallel with programmable discharge-current sources, in which a second terminal of the current source $I_{20}$ is connected to the ground reference level. The current source $I_{20}$ and programmable charge-current sources produce a discharge current $I_{DCHG}$.

A charge switch $S_{31}$ is connected between a second terminal of the current source $I_{10}$ and a capacitor C. A discharge switch $S_{41}$ is connected between the capacitor C and a first terminal of the current source $I_{20}$. A comparator 210 has a positive input supplied with a threshold voltage $V_H$. A negative input of the comparator 210 is connected to the capacitor C. A comparator 220 has a negative input supplied with a threshold voltage $V_L$. The threshold voltage $V_H$ is higher than the threshold voltage $V_L$. A positive input of the comparator 220 is connected to the capacitor C. A NAND gate 230 outputs an oscillation signal PLS to turn on/off the discharge switch $S_{41}$. A first input of the NAND gate 230 is driven by an output of the comparator 210. A NAND gate 240 has an output to turn on/off the charge switch $S_{31}$. Two inputs of the NAND gate 240 are respectively connected to the output of the NAND gate 230 and an output of the comparator 220. The output of the NAND gate 240 is further connected to a second input of the NAND gate 230.

Figure 4:
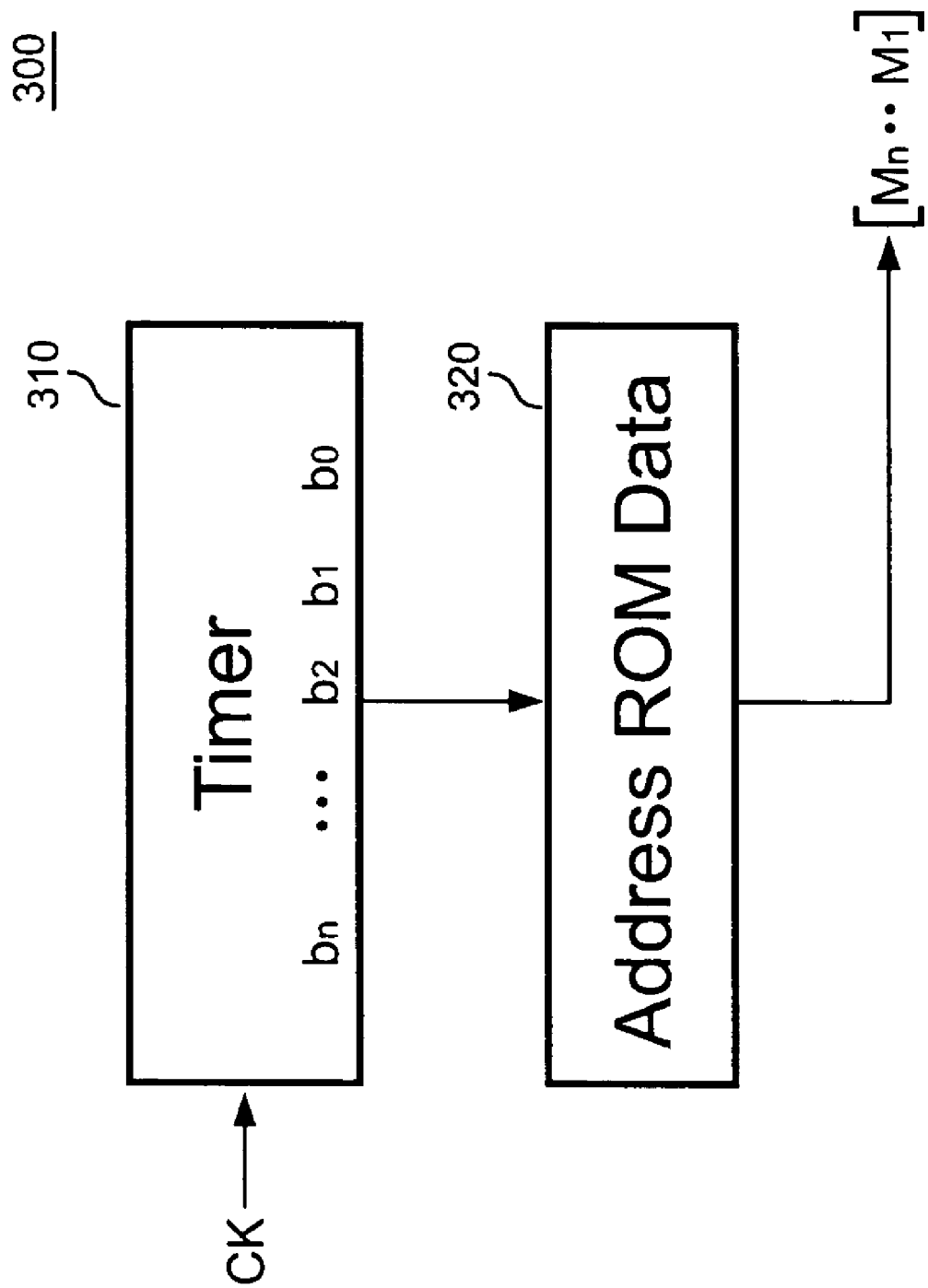
FIG. 4 shows an embodiment of a pattern generator according to the present invention.

FIG. 4 shows an embodiment of the pattern generator 300 according to the present invention. A timer 310 generates a binary code [$b_n \ldots b_0$] in response to the clock signal CK. A read-only-memory 320 generate the pattern code [$M_n \ldots M_1$] in response to the binary code [$b_n \ldots b_0$]. The address inputs of the read-only memory 320 are driven by the output of the timer 310.

Figure 5:
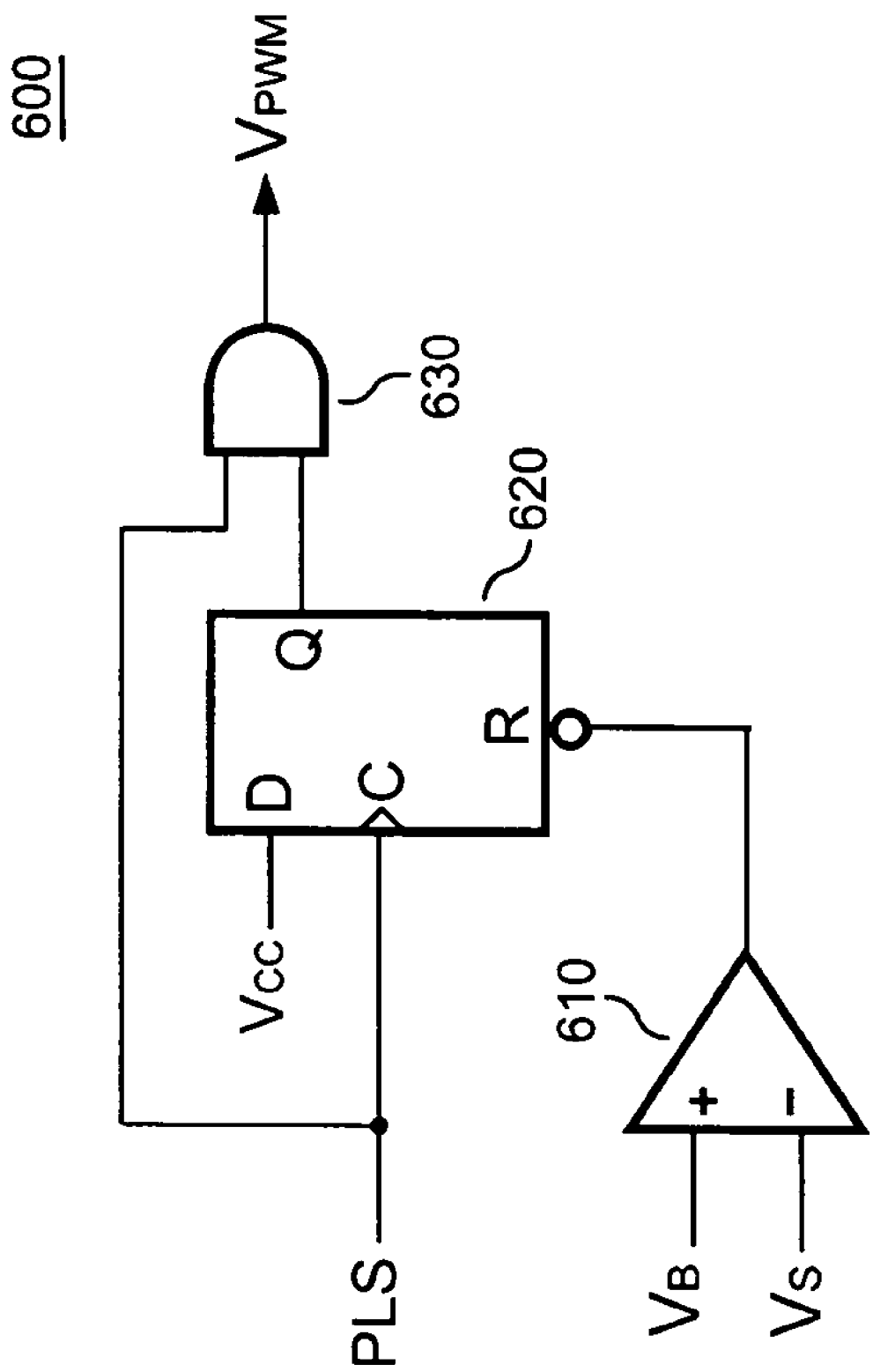
FIG. 5 shows a PWM control circuit.

As shown in FIG. 5, the PWM control circuit 600 comprises a comparator 610, a D flip-flop 620 and an AND gate 630. The comparator 610 is used to reset the D flip-flop 620. The voltage $V_B$ outputted from the attenuator 500 supplies a positive input of the comparator 610. The switching-current signal $V_S$ supplies a negative input of the comparator 610 A D input of the D flip-flop 620 is pulled high by the supply voltage $V_{CC}$. A clock input of the D flip-flop 620 is supplied with the oscillation signal PLS. A first input of the AND gate 630 is also supplied with the oscillation signal PLS. A second input of the AND a gate 630 is connected to an output of the D flip-flop 620. An output of the AND gate 630 generates the switching signal $V_{PWM}$.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching frequency jitter having output ripple cancel, comprising:
   a clock generator, for generating a clock signal;
   a pattern generator, for generating a pattern code in response to said clock signal;

an oscillator, for generating an oscillation signal to determine a switching frequency of a switching signal in response to said pattern code;

an attenuator, connected to a voltage feedback loop for attenuating a feedback signal, wherein said feedback signal is utilized to control a pulse width of said switching signal and to control an output power and an output voltage of a power supply; and a programmable resistor, connected to said attenuator for programming an attenuation rate of said attenuator in response to said pattern code.

2. The switching frequency jitter having output ripple cancel of claim 1, wherein said programmable resistor comprises:

switching-resistor sets, connected to each other in parallel, wherein said switching-resistor sets are formed by connecting attenuator switches and attenuator resistors in series respectively, wherein said attenuator switches are controlled by said pattern code.

3. The switching frequency jitter having output ripple cancel of claim 1, wherein said oscillator comprises:

programmable charge-current sources, connected to each other in parallel, wherein said programmable charge-current source is formed by a charge current source and a charge switch connected in series, wherein said charge switches are controlled by said pattern code;

a first charge-current source, connected in parallel with said programmable charge-current sources, wherein a first terminal of said first charge-current source is supplied with a supply voltage, wherein said first charge-current source and said programmable charge-current sources produce a charge current;

programmable discharge-current sources, connected to each other in parallel, wherein said programmable discharge-current source is formed by a discharge current source and a discharge switch connected in series, wherein said discharge switches are controlled by said pattern code;

a first discharge-current source, connected in parallel with said programmable discharge-current sources, wherein a second terminal of said first discharge-current source is connected to a ground reference level, wherein said first discharge-current source and said programmable discharge-current sources produce a discharge current;

an osc capacitor;

an osc-charge switch, connected between a second terminal of said first charge-current source and said osc capacitor;

an osc-discharge switch, connected between a first terminal of said first discharge-current source and said osc capacitor;

a first comparator, wherein a positive input of said first comparator is supplied with a first osc-threshold voltage and a negative input of said first comparator is connected to said osc capacitor;

a second comparator, wherein a negative input of said second comparator is supplied with a second osc-threshold voltage and a positive input of said second comparator is connected to said osc capacitor, and wherein said first osc-threshold voltage is higher than said second osc-threshold voltage;

a first NAND gate, for generating said oscillation signal, wherein a first input of said first NAND gate is driven by an output of said first comparator, wherein an output of said first NAND gate is connected to a control terminal of said osc-discharge switch to turn on/off said osc-discharge switch; and a second NAND gate, for turning on/off said osc-charge switch, wherein two inputs of said second NAND gate are respectively connected to said output of said first NAND gate and an output of said second comparator; wherein an output of said second NAND gate is connected to a second input of said first NAND gate and a control terminal of said osc-charge switch.

4. The switching frequency jitter having output ripple cancel of claim 1, wherein said pattern generator comprises:

a timer, for generating a binary code in response to said clock signal;

a read-only-memory, for generating said pattern code in response to said binary code, wherein address inputs of said read-only-memory are connected to an output of said timer; and wherein data outputs of said read-only-memory output said pattern code.

* * * * *